Nov. 30, 1937.  W. W. WOHLFARTH  2,100,463
VEHICLE CONSTRUCTION
Filed June 22, 1936  2 Sheets-Sheet 2
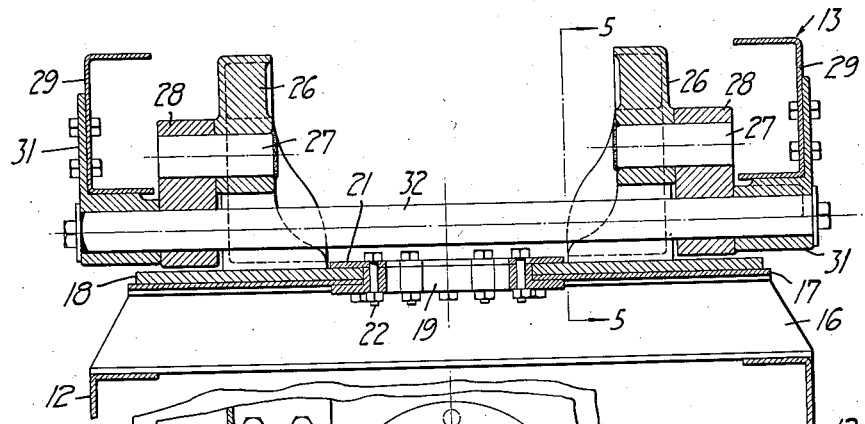
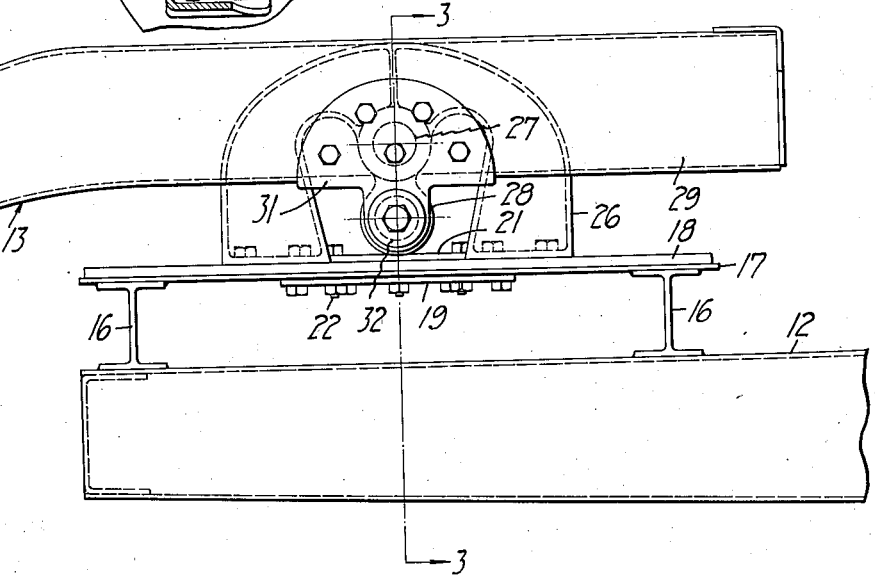
INVENTOR.
Walter W. Wohlfarth
BY
Robert H. Eckhoff
ATTORNEY.

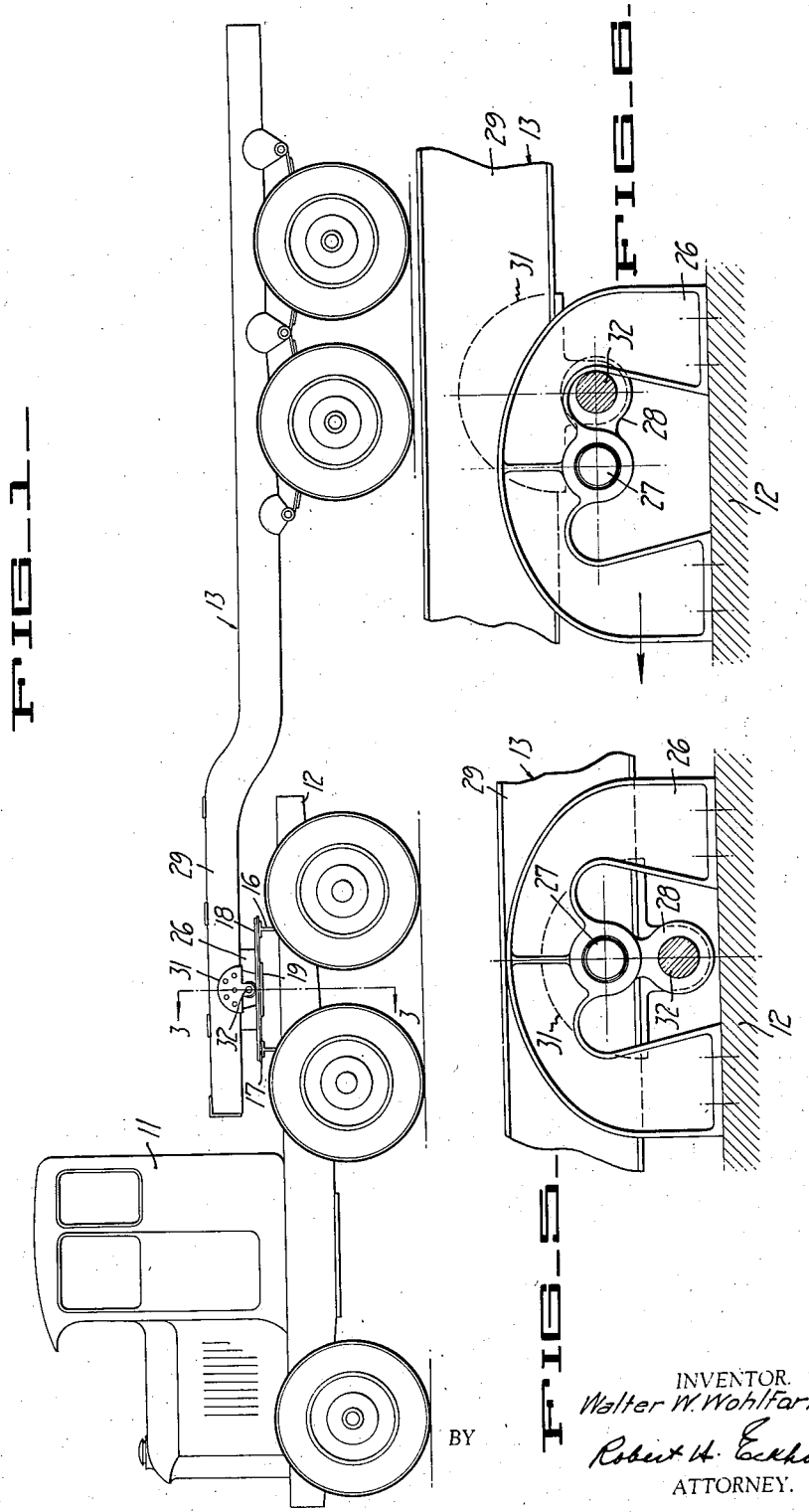

Patented Nov. 30, 1937

2,100,463

UNITED STATES PATENT OFFICE 2,100,463

VEHICLE CONSTRUCTION

Walter W. Wohlfarth, San Francisco, Calif., assignor to A. Ted Ashjian and J. B. Sweet, both of Fresno, Calif.

Application June 22, 1936, Serial No. 86,467

2 Claims. (Cl. 280—33.1)

This invention relates to a vehicle construction, particularly to a vehicle which includes a draft unit, a trailer unit and a fifth wheel therebetween.

It is an object of the present invention to provide a vehicle construction including a trailer connected to a draft vehicle by means taking up and equalizing any difference in rates in the movement of the two units. Thus, the means of the present invention provides for adapting the rates of movement and an equalization in the rates of movement of the two units. For example, if the vehicle is started from a stop, the initial shock of starting the draft vehicle is absorbed and gradually transmitted to the trailer unit. The same action occurs if the draft vehicle is suddenly slowed down, the trailer unit being permitted to over run the draft vehicle until the rates of movement equalize.

Another object of the present invention is to provide an improved fifth wheel means for connecting a truck and trailer unit in a simple, rugged manner.

Another object of the present invention is to provide a draft vehicle and trailer connection permitting rotation of the draft unit with respect to the trailer so that the vehicle can be steered while inequalities in rates of movement of the two are equalized and are absorbed, even though the two units are at an angle.

The invention includes numerous other objects and features of advantage, some of which, together with the foregoing, will appear hereinafter wherein the present preferred form of the invention is disclosed.

In the drawings accompanying and forming a part hereof, Figure 1 is a side elevation showing a vehicle embodying the present invention.

Figure 2 is an enlarged side elevation illustrating the means of connection of the present invention.

Figure 3 is a section taken along the line 3—3 of Figure 2.

Figure 4 is a plan view, partly in section, taken through the connection means.

Figure 5 is a section taken along the line 5—5 of Figure 3.

Figure 6 is a side elevation illustrating operation of the connecting means.

The invention is disclosed in conjunction with a vehicle including a draft unit 11 including a frame 12. A trailer 13 is connected to and is supported by the draft unit 11, the connecting means being hereinafter disclosed.

In accordance with this invention, a fifth wheel means is preferably provided between the draft unit 11 and the trailing unit 13 for the steering of the unit by rotation of the draft unit 11 with respect to the trailer 13. Mounted upon frame 12 (see Figure 3) are I beams 16. These beams extend transversely across the frame 12 and support a bottom plate 17 in the form of an annulus. The plate 17 is fixed to the beams 16 and supports a plate 18, also an annulus. Plate 18 is rotatable on the fixed plate 17 to provide a swivel connection. The two plates are secured together by inserting a member 19 through the annular opening in each plate and securing a plate 21 thereon by means of bolts 22. A fifth wheel structure is thus secured.

The connection means of the present invention are mounted upon the plate 18. These include two M shaped members 26 usually made up of steel castings and having stub shafts 27 extending outwardly toward the outside of the trailer frame, the stub shafts being secured to the castings by electric welding. The stub shafts are placed at the mid point of each M member. Depending from the stub shafts 27 are a pair of links 28. Stub shafts 27 provide the first shaft of the claim. It can be made in one piece or as stub shafts as shown, and the term "first shaft" is used to cover both constructions. Each link is rotatably mounted upon the stub shaft and depends therefrom.

Mounted upon trailer frame 29 are a pair of like brackets 31. These brackets are secured together by a common shaft 32 which extends across the trailer frame. Shaft 32 is the second shaft of the claim. This term is used to cover both the stub shaft construction and the single shaft construction illustrated. This shaft can be replaced by a pair of stub shafts if desired but I prefer that a single shaft be used for the purpose of securing a stiff construction. Each link 28 engages the shaft 32 and is rotatably mounted thereon.

In accordance with this invention, it is to be pointed out that the links 28 depend from the shaft 27 and that, as appears in Figure 5, the shaft 32 passes between the legs of the M shaped castings 26. Thus the full load of the trailer is placed upon the links 28 and this load is utilized as the means to absorb the shock forces passing between the draft unit and the trailing unit during movement of the vehicle. For example, if the draft unit 11 is started up this will result in rotation of the links 28, possibly even to such an extreme extent as that shown in Figure 6. In this position, the full weight of the trailer unit is resisting the rotational movement of the links and is tending to force the links into that position shown in Figure 5. Thus the forward force exerted by the draft unit 11 is resisted in a non-destructive but very simple manner so that a simple but effective connection is provided between the two units of the vehicle.

The links are free to swing in a direction opposite to that of Figure 6 to permit the trailer to over run the draft unit and thus absorb any sudden negative acceleration rate of the draft unit with respect to the trailer.

It is particularly pointed out that the gravity cushion is independent of the fifth wheel and functions properly, without any binding, even though the truck and trailer are not tracking but are at an angle to each other as when the truck is steered to turn the vehicle.

I claim:

1. In combination, a vehicle, a trailing vehicle, a fifth wheel mounted upon said vehicle and carried thereby, shaft support means carried by said fifth wheel and extending above said wheel, a first shaft carried by said support means, a link hinged at one end on said shaft and hanging therefrom, a second shaft engaged with the other end of said link, and means securing said second shaft to said trailing vehicle.

2. In combination, a vehicle, a trailing vehicle, a fifth wheel mounted upon said vehicle and carried thereby, shaft support means carried by said fifth wheel and extending above said wheel on opposite sides thereof, a first shaft carried by said support means, a link hinged at one end on said shaft and hanging therefrom adjacent each support means, a second shaft engaged with the other end of each link, and means securing said second shaft to said trailing vehicle.

WALTER W. WOHLFARTH.